United States Patent [19]

Kotajima

[11] Patent Number: 5,507,077
[45] Date of Patent: Apr. 16, 1996

[54] INTERLOCKING CONNECTOR SYSTEM

[75] Inventor: Nobuhiko Kotajima, Canton, Mich.

[73] Assignee: Yazaki Corporation, Tokyo, Japan

[21] Appl. No.: 320,498

[22] Filed: Oct. 7, 1994

[51] Int. Cl.$^6$ .................................................. H02G 3/16
[52] U.S. Cl. ................................. 24/669; 24/702; 403/3; 403/11; 439/532
[58] Field of Search ........................ 24/669, 702; 403/3, 403/4, 11, 326; 439/532, 717

[56] References Cited

U.S. PATENT DOCUMENTS

| | | | |
|---|---|---|---|
| 3,474,397 | 10/1969 | Pjasecki | 439/717 |
| 4,425,018 | 1/1984 | Stenz | 439/717 X |
| 4,580,861 | 4/1986 | Kaley | 439/717 X |
| 5,048,161 | 9/1991 | Watanabe et al. | 24/669 X |
| 5,259,787 | 11/1993 | Byrne | 439/532 |
| 5,295,870 | 3/1994 | Rei et al. | 439/717 |

FOREIGN PATENT DOCUMENTS

| | | | |
|---|---|---|---|
| 411503 | 6/1910 | France | 24/669 |
| 3830375 | 3/1990 | Germany | 439/717 |
| 61-134629 | 8/1986 | Japan . | |

*Primary Examiner*—James R. Brittain
*Attorney, Agent, or Firm*—Young, MacFarlane & Wood

[57] ABSTRACT

A slide lock system allows one or more connector bodies to be mounted at various locations on a mounting surface. A plurality of parallel, uniformly spaced rails are formed on the mounting surface. The rails define a plurality of parallel, uniformly spaced channels which are open on one end and closed on the opposite end. A pair of parallel, spaced apart rails are formed on each connector body. The connector rail spacing is an integral multiple of the spacing between the channels on the mounting surface such that the connector rails are endwise inserted into the open end of any of the plurality of channels.

20 Claims, 3 Drawing Sheets

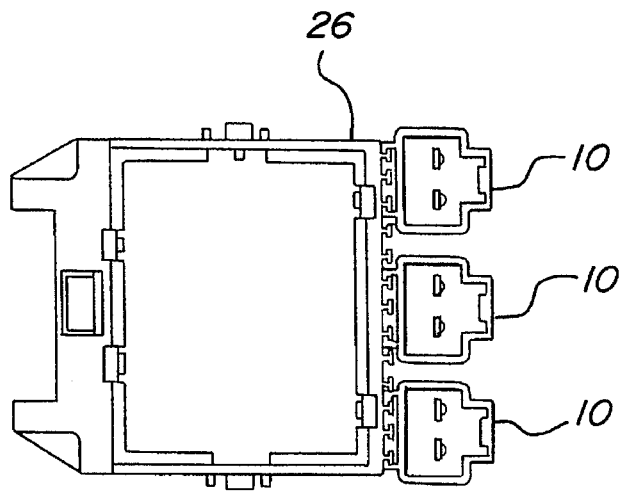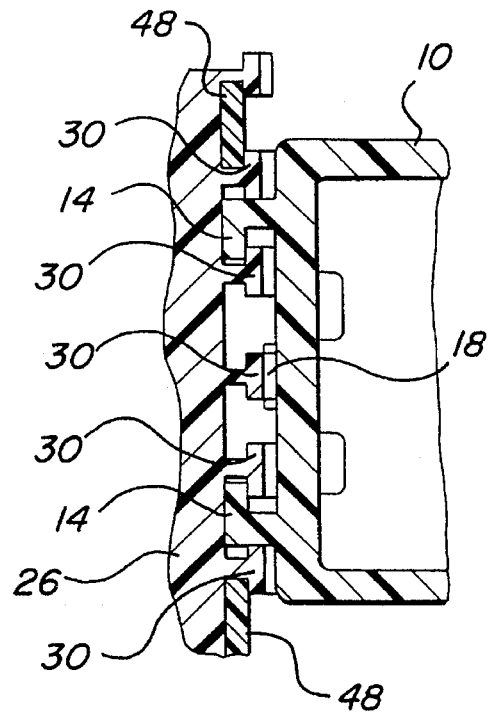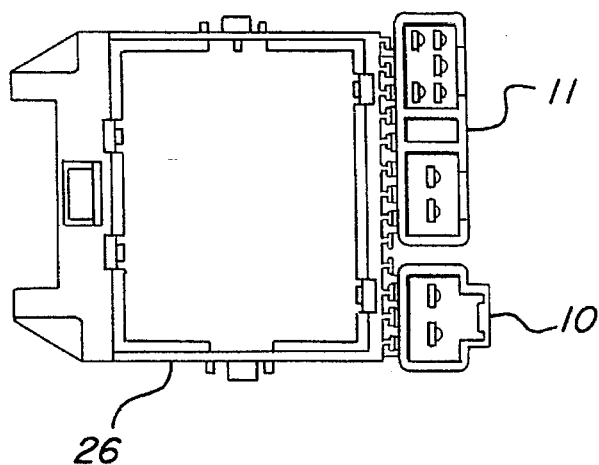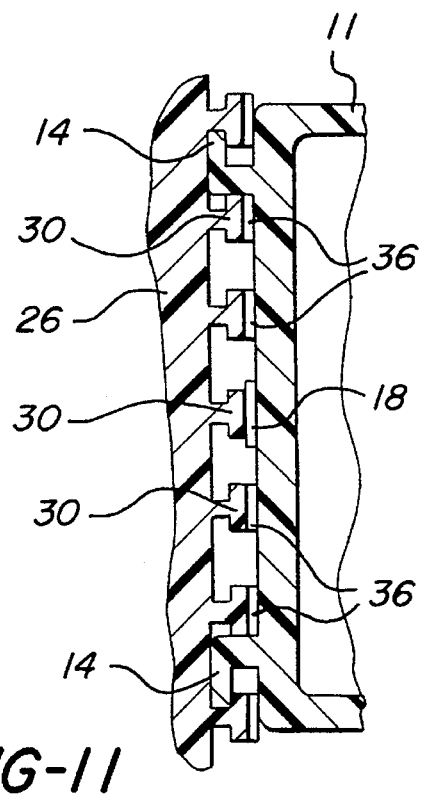

5,507,077

INTERLOCKING CONNECTOR SYSTEM

FIELD OF THE INVENTION

This invention relates to slide rail connectors for automotive wiring harness mounts and, more particularly, to a slide rail connector system which affords flexibility and accuracy in mounting connector blocks on mounting brackets and the like.

BACKGROUND OF THE INVENTION

U.S. Pat. No. 5,048,161, issued Sep. 17, 1991 and assigned to Yazaki Corporation discloses a slide rail connector arrangement by which a connector block of the type suitable for joining serial lengths of electrical conductors is mountable on a bracket or other suitable structural component. The connector block is provided on an outside surface with spaced parallel rails defining a female slot which is open at one end and closed at the other. The bracket is provided on an outside surface with spaced, parallel and oppositely extending fingers which are complemental to the female slot and which can be slidingly entered into the slot from the open end. Interengaging lock means are provided on the connector and bracket within the slot to releasably lock the mounting block in place when the male slide portion is driven home. In this arrangement, there are specific locations for the mounting blocks and incremental repositioning is not possible.

Another mounting system is disclosed in Japanese Patent No. 61-134629. This system uses adapters which permit different connectors to be mounted on a single bracket. The adapter is positioned between the connector and the bracket. However, a specific adapter is needed for each possible mounting block configuration. Thus, each time a new connector configuration is required, a new adapter must be designed. The use of an adapter requires an inventory of multiple adapters for each particular application. Using an adapter also requires an additional assembly step to install the adapter and adds to the complexity of the mounting system. Therefore, these connectors lack versatility because a specific adapter must be designed for each application.

SUMMARY OF THE INVENTION

The present invention provides a slide rail connector mounting system which allows connector blocks to be mounted at incrementally variable locations on a mounting structure such as a bracket. A single bracket can be used to hold multiple connectors in various configurations. Therefore, a single bracket design can be used in a variety of different applications. A connector can be incrementally repositioned on an existing bracket; i.e., moved laterally by an increment less than the normal spacing between connector blocks, without the need to design a new bracket. Also, an additional connector can be added to an existing bracket without any design changes. Using a single bracket for multiple applications reduces the number of different parts to be kept in inventory. Also, since the same connector design may be used at multiple locations on the same bracket, fewer types of connectors must be maintained in inventory.

In the preferred form, the present slide rail mount system includes a rigid body serving as a bracket and a connector which is detachably mounted to the bracket. A plurality of parallel, uniformly spaced rails are formed on an outside wall of the bracket. These rails create a plurality of parallel, incrementally spaced channels which are open on one end and closed on the opposite end. The bracket contains both inside channels and outside channels, allowing the mounting of both complemental male channel connectors and complemental female connectors thereon. Each rail has a retainer projection extending outwardly which interacts with a corresponding projection on the connector to secure the connector to the bracket. In the preferred form, the bracket is secured to a mounting surface such as a body panel in a vehicle. The body serving as the bracket can also serve other functions; i.e., although it may be simply a mounting bracket, it can also be a fuse box, battery box, or other component in a vehicle.

At least a pair of parallel, spaced apart rails are formed on an outer surface of each connector. The connector rails are complemental to the channels of the bracket. The spacing between the connector rails is an integral multiple of the spacing between the bracket channels such that the rails slide into the open end of the channel at any of a plurality of locations. A connector lock projection is formed on an outer surface of the connector. The connector lock projection interacts with the locking projection on the bracket just prior to the point where the slide rails are driven home to secure the connector to the bracket. This prevents the connector from disengaging the bracket due to vibration or tension.

The bracket further includes a plurality of channel stops located between adjacent rails. The channel stops form the closed end of the bracket channels. Each channel stop includes a cavity which opens into the channel.

To ensure that connector blocks are properly located during an assembly operation, blocking plugs may be endwise inserted between adjacent bracket rails to prevent connectors from being endwise inserted into particular channels. Each blocking plug has a projection extending axially outward from one end of the blocking plug. The projection has a diameter slightly larger than the cavity opening in the channel stop. The interaction between the projection and the channel stop cavity locks the blocking plug into the channel. By placing blocking plugs into unused channels, the proper positioning of the connector on the bracket may be clearly identified. The blocking plugs are removable from the channel stops if connector placement or orientation is to be changed. After the plugs are inserted into the bracket, a check fixture may be used to verify proper placement of the blocking plugs.

BRIEF DESCRIPTION OF THE DRAWINGS

FIG. 8 is a top view showing a bracket with three connectors attached;

FIG. 9 is a detailed top view illustrating the interaction between the T-shaped bracket rails and the L-shaped connector rails of FIG. 8;

FIG. 10 is a top view showing an alternate arrangement of a bracket and two connectors; and FIG. 11 is a detailed top view illustrating the L-shaped connector rails and the T-shaped bracket rails of the configuration in FIG. 10.

DETAILED DESCRIPTION OF THE PREFERRED EMBODIMENT

Figure 1:
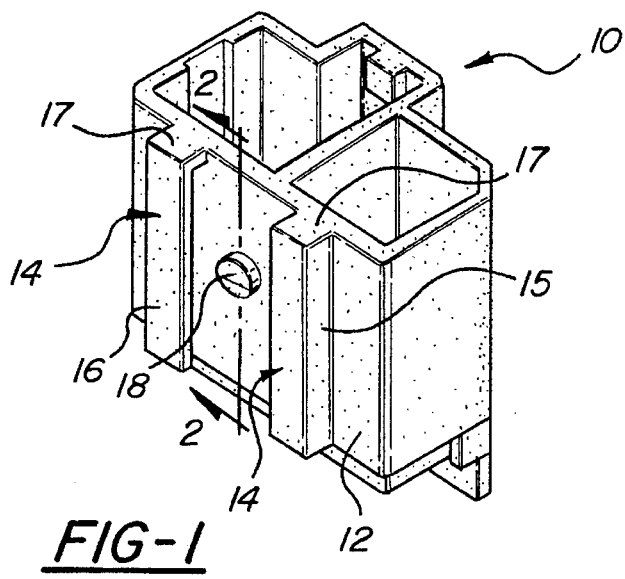
FIG. 1 is a perspective view of the connector.

FIG. 1 shows a connector 10 of rigid, molded plastic construction having interior compartments for receiving electrical connectors. Connectors 10 are used to make junctions or serial connections between lengths of electrical wiring equipped with suitable plug-in terminals. Connector 10 contains an outer surface 12 and a pair of L-shaped connector rails 14. Each connector rail 14 contains a first wall 15 and a second wall 16. Each wall 15 is positioned toward the outer edge of connector side wall 12. Thus, a slot is formed between wall 16 and connector surface 12. On each connector rail 14, the slot opens toward the middle of connector side wall 12. A stop wall 17 is positioned at one end of each connector rail 14. Stop wall 17 closes the slot at one end of each connector rail, while the opposite end remains open for mounting purposes. A connector lock projection 18 is located between the two connector rails 14.

Figure 2:
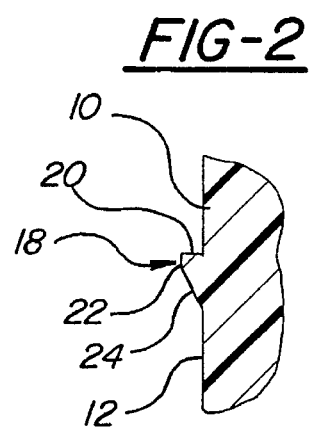
FIG. 2 is a side view shown in cross section, illustrating the connector lock projection.

Referring to FIG. 2, connector lock projection 18 contains a top portion 20 which extends perpendicularly outward from connector 10. Lock projection 18 further includes a side portion 22 located parallel to connector wall 12 and a ramp portion 24 which forms an incline between connector wall 12 and side portion 22. In the preferred embodiment, connector lock projection 18 is located midway between connector rails 14.

Although a particular type of connector lock projection has been disclosed, it will be understood that other types of locking projections can also be used with this invention.

Figure 3:
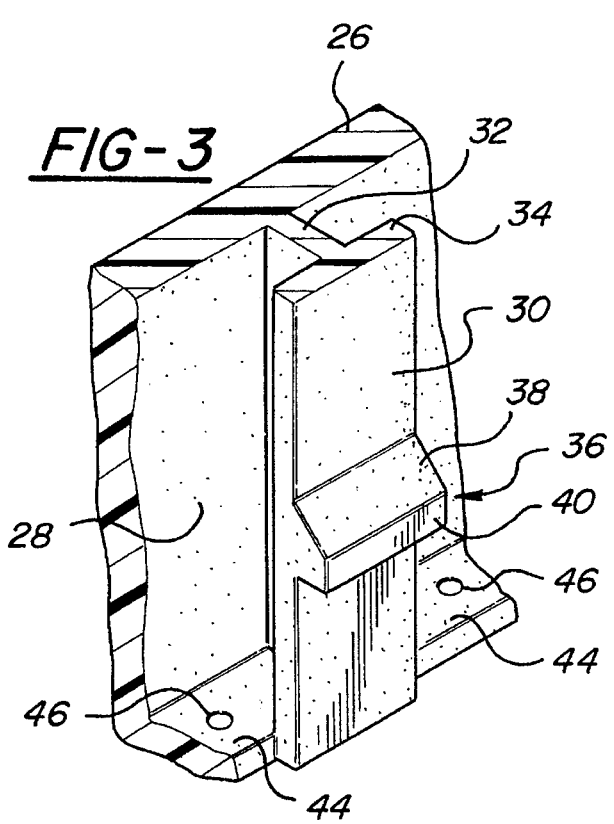
FIG. 3 is a perspective view showing a single T-shaped rail and the corresponding retainer projection and channel stops.
Figure 4:
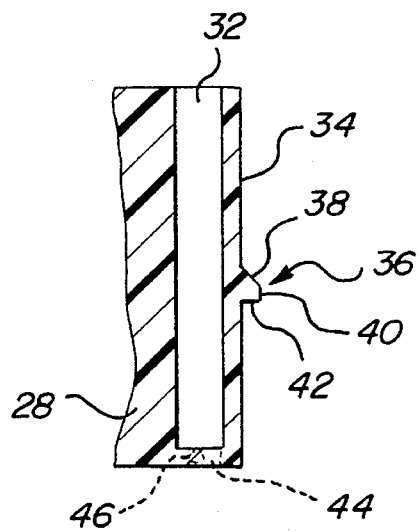
FIG. 4 is a side view of the bracket shown in cross section, illustrating the retainer projection and the channel stop.
Figure 6:
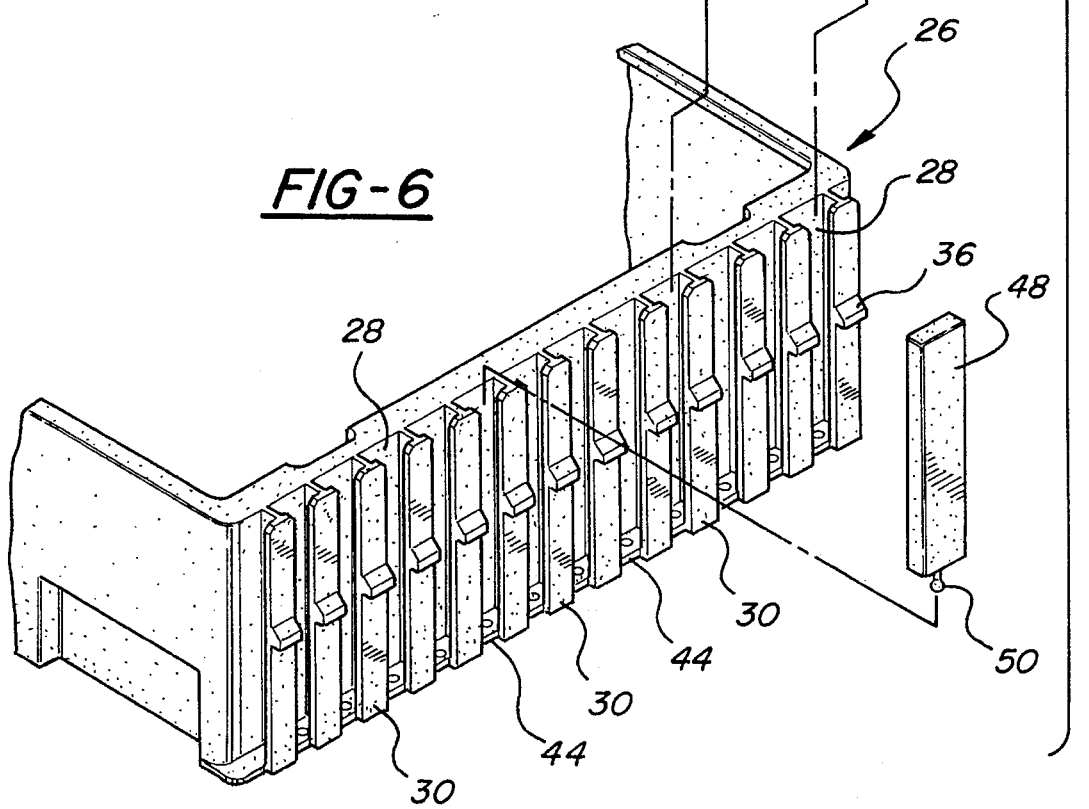
FIG. 6 is an exploded perspective view showing the connector, bracket and blocking plug.

A bracket 26 (shown in FIG. 6) contains a bracket side wall 28 and is mountable to a panel (not shown), such as a body panel in an automobile. Bracket 26 provides a rigid mounting structure for attaching connectors 10. Bracket 26 has a plurality of T-shaped rails 30 formed on the outer surface of bracket side wall 28. Referring to FIG. 3, each rail 30 includes a first wall 32 which extends outwardly from bracket 26, and a second wall 34 which is perpendicular to first wall 32. Each rail 30 has a retainer projection 36 formed on the outer surface of wall 34. As shown in FIG. 4, retainer projection 36 includes a ramp portion 38 which forms an incline extending outwardly from wall 34. Retainer projection 36 also includes a side portion 40 located parallel to wall 34 and a bottom portion 42 extending outwardly from wall 34.

Figure 5:
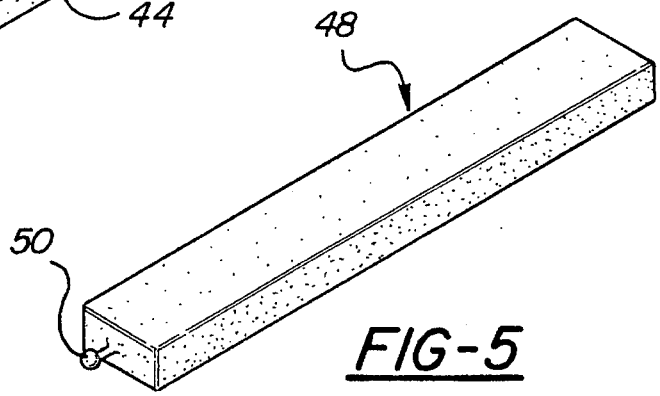
FIG. 5 is a perspective view of the blocking plug.
Figure 7:
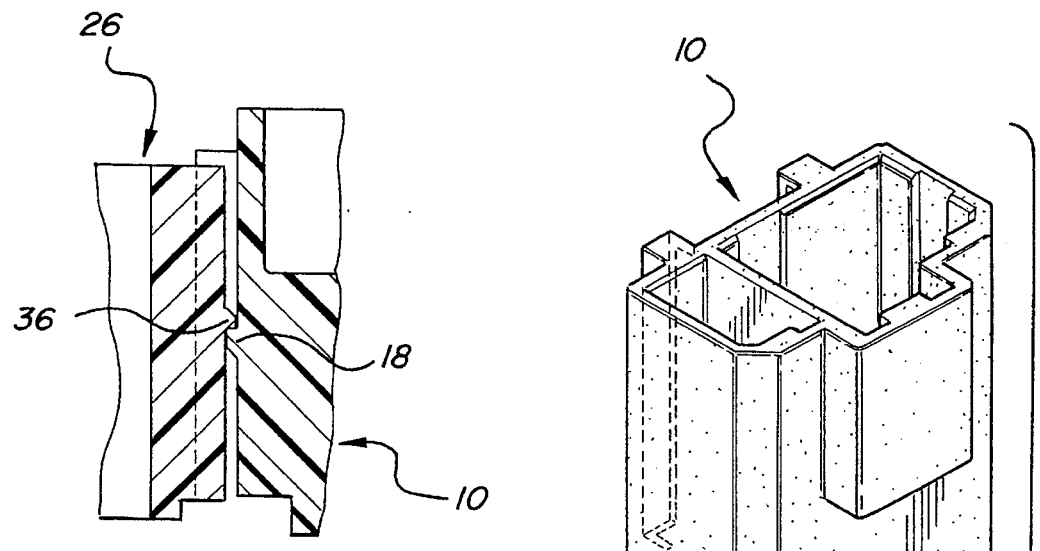
FIG. 7 is a cross-sectional view showing the interaction of the connector lock projection with the retainer projection.

A channel stop 44 (shown in FIGS. 3 and 6) is located between each pair of adjacent rails 30. Channel stops 44 are located at the bottom of the channel formed by the rails 30, thereby closing that end of the channel. Each channel remains open on the opposite end. Each channel stop 44 contains a cavity 46 which opens into the channel. A blocking plug 48 (shown in FIGS. 5 and 6) may be endwise inserted between adjacent rails 30. Blocking plug 48 contains a lock projection 50 extending outwardly from one end of the blocking plug. Lock projection 50 has a diameter slightly larger than the opening of cavity 46. This permits blocking plug 48 to be secured within the channel.

In operation, bracket 26 is secured to a panel such as a body panel in a vehicle. Blocking plugs 48 are endwise inserted into the channels in bracket 26 which will not be used by connector 10. Blocking plugs 48 prevent endwise insertion of connector rails 14 into the "blocked" channels. This makes insertion of connector 10 onto bracket 26 less prone to erroneous placement because only certain channels are available. Connector 10 cannot be inserted into a channel which already contains a blocking plug 48. Preferably, blocking plugs 48 are inserted into bracket 26 before the bracket is mounted to a panel. Since rails 30 are uniformly spaced, the channel between each pair of rails 30 is of uniform size. Therefore, a single type of blocking plug 48 is insertable into any channel on bracket 26. Blocking plugs 48 can be removed from one channel and reinserted in another channel, thus providing the flexibility to modify the position of connector 10 on bracket 26.

After blocking plugs 48 have been inserted into bracket 26, a check fixture having simulated connector elements of predetermined spacing (not shown) is used to verify proper placement of the blocking plugs. If all blocking plugs 48 are inserted properly, the check fixture will slide into the channels of bracket 26. If one or more blocking plugs 48 are installed in the wrong positions, then the check fixture will be prevented from sliding into one or more channels. If the check fixture indicates proper installation of blocking plugs 48, then assembly may continue with either the attachment of connectors 10 to bracket 26 or the mounting of bracket 26 to the vehicle panel. If the check fixture indicates incorrect placement of one or more blocking plugs 48, then the blocking plugs can be repositioned before assembly procedures continue.

Connector 10 is mounted to bracket 26 by aligning the connector with the proper channels on the bracket. Each connector rail 14 interacts with a bracket rail 30 on bracket 26. As connector 10 slides along the bracket rails 30, connector lock projection 18 contacts retainer projection 36. Initially, ramp portion 24 of lock projection 18 will contact ramp portion 38 of retainer projection 36. As additional force is applied, connector wall 12 and bracket wall 28 are deflected away from each other, allowing the two ramp portions 24,38 to slide past each other. With continued force, connector lock projection 18 will slide past retainer projection 36. At this point, connector wall 12 and bracket wall 28 return to their original positions, locking connector 10 to bracket 26. This locking action prevents the separation of connector 10 from bracket 26 due to vibration or tension. Connector stop wall 17 contacts the top of rail 30 which prevents connector 10 from sliding any further distance along bracket rail 30. A similar procedure is followed if an additional connector 10 must be mounted to the same bracket 26.

FIG. 8 shows the present invention using bracket 26 and three connectors 10. In this arrangement, each of the three connectors 10 are the same type. FIG. 9 shows the interaction of a single connector 10 with bracket 26, and the interaction between connector rails 14 and bracket rails 30. Blocking plugs 48 have been installed in the channels found on either side of the correct connector position. Thus, an assembler could not inadvertently install connector 10 one position to the left or one position to the right of the correct position. Alternatively, blocking plugs 48 may be installed in the two open slots between connector rails 14. This arrangement would indicate to the assembler that connector 10 should straddle the two bracket rails.

As shown in FIG. 9, three bracket rails 30 are located between the pair of connector rails 14. The two outer bracket rails 30 interact with connector rails 14. The middle bracket rail 30 aligns with connector lock projection 18. Therefore, retainer projection 36 which extends outwardly from the middle bracket rail 30 interacts with connector lock projection 18 to secure connector 10 to bracket 26.

FIG. 10 shows bracket 26 with two connectors 10,11 attached. In this arrangement, the two connectors are different sizes. FIG. 11 shows the larger connector 11 and the corresponding bracket rails 30. In this configuration, five bracket rails 30 are located between the pair of connector rails 14. This leaves four open channels between the connector rails. However, the interaction between connector rails 14 and bracket rails 30 is the same. Similarly, blocking plugs 48 may be inserted in the channels on either side of the proper connector mounting channels. The middle bracket rail 30 aligns with connector lock projection 18. Thus, retainer projection 36 extending from the middle bracket rail 30 interacts with lock projection 18 to secure connector 11 to bracket 26.

Two types of connectors have been illustrated, one which spans three bracket rails and another which spans five bracket rails. However, it will be understood that a connector may span any number of bracket rails, up to the width of the bracket.

Since bracket rails 30 are T-shaped, a plurality of inside channels and outside channels are created on bracket 26. An inside channel is formed using the inner surfaces of a pair of rails 30. An outside channel is formed using the outer surfaces of a pair of rails 30. Since both inside and outside channels are available on bracket 26, connectors 10 with either an inside channel or an outside channel can be mounted to the bracket.

As shown in FIG. 9, rails 14 on connector 10 are pointed toward each other, forming an inside connector channel. The inside channel of connector 10 interacts with an outside channel on bracket 26 formed by a pair of rails 30.

As shown in FIG. 10, rails 14 on connector 11 are pointed away from each other, forming an outside connector channel. The outside channel of connector 11 interacts with an inside channel on bracket 26 formed by a pair of rails 30.

Although a particular embodiment of the present invention has been described as mounted to a bracket, it will be understood that rails 30 are not required to be formed on a bracket. Instead, rails 30 can be formed on the outer surface of a fuse box, battery box, body panel, or other such component.

Furthermore, a particular embodiment of the invention has been described as used in a vehicle for securing wiring harnesses and connectors to a mounting surface. However, it will be understood that the present invention can be used in any application which requires a slide lock connection system for securing a first component to a second component.

I claim:

1. A slide lock system for securing a first component to a second component, comprising:

a plurality of parallel, uniformly spaced T-shaped rails formed on the first component, said T-shaped rails defining a plurality of parallel, uniformly spaced channels, each channel having an open end and a closed end;

a retainer projection formed on each T-shaped rail;

a pair of parallel, spaced apart L-shaped rails formed on the second component, said L-shaped rails having a spacing which is an integral multiple of the spacing between the channels on the first component, said L-shaped rails capable of endwise insertion into the open end of the channels on the first component; and a lock projection formed on the second component and positioned between the pair of L-shaped rails.

2. The apparatus of claim 1 wherein the retainer projection includes a bottom portion extending outwardly from the T-shaped rail, a side portion extending from the bottom portion, and a ramp portion located between the side portion and the T-shaped rail.

3. The apparatus of claim 1 wherein the lock projection includes a top portion extending outwardly from the second component, a side portion extending from the top portion, and a ramp portion located between the side portion and the second component.

4. The apparatus of claim 1 further including a plurality of channel stops extending outwardly from the outer surface of the first component and located between adjacent rails on the first component, each channel stop having material removed to form a cavity for engaging and retaining a channel blocking plug.

5. The apparatus of claim 1 further including a blocking plug capable of being endwise inserted between adjacent rails on the first component, the blocking plug having a plug projection extending axially outward from the blocking plug.

6. The apparatus of claim 1 further including a plurality of channel stops extending outwardly from the outer surface of the first component and located between adjacent rails on the first component, each channel stop having material removed to form a cavity having a diameter, and a blocking plug capable of being endwise inserted between adjacent rails on the first component, the blocking plug having a plug projection extending axially outward from the blocking plug, the plug projection having a diameter slightly larger than the diameter of the cavity.

7. The apparatus of claim 1 wherein the plurality of rails on the first component define a plurality of inner channels and a plurality of outer channels.

8. The apparatus of claim 1 wherein the pair of rails on the second component define an inner channel.

9. The apparatus of claim 1 wherein the pair of rails on the second component define an outer channel.

10. The apparatus of claim 1 wherein said retainer projection engages said lock projection to secure said first component to said second component.

11. A slide lock connection system for securing a connector to a bracket, comprising:

a plurality of parallel, uniformly spaced bracket rails extending outwardly from the bracket, said bracket rails defining a plurality of parallel, uniformly spaced channels, each channel having an open end and a closed end;

a retainer projection extending outwardly from each of the bracket rails;

a pair of parallel, spaced apart connector rails extending outwardly from the connector, said connector rails having a spacing which is an integral multiple of the spacing between the bracket channels, said connector rails capable of endwise insertion into the open end of said bracket channels; and a lock projection extending outwardly from the outer surface of the connector and positioned between the pair of connector rails, said lock projection engageable with said retainer projection to secure said connector to said bracket.

12. The apparatus of claim 11 wherein the bracket retainer projection includes a bottom portion extending outwardly from the bracket rail, a side portion extending from the bottom port ion, and a ramp portion located between the side portion and the bracket rail.

13. The apparatus of claim 11 wherein the connector lock projection includes a top portion extending outwardly from the outer surface of the connector, a side portion extending from the top portion, and a ramp portion located between the side portion and the outer surface of the connector.

14. The apparatus of claim 11 further including a plurality of channel stops extending outwardly from the outer surface of the bracket and located between adjacent bracket rails, each channel stop having material removed to form a cavity for engaging and retaining a channel blocking plug.

15. The apparatus of claim 11 further including a blocking plug capable of being endwise inserted between adjacent bracket rails, the blocking plug having a plug projection extending axially outward from the blocking plug.

16. The apparatus of claim 11 further including a plurality of channel stops extending outwardly from the outer surface of the bracket and located between adjacent bracket rails, each channel stop having material removed to form a cavity having a diameter, and a blocking plug capable of being endwise inserted between adjacent bracket rails, the blocking plug having a plug projection extending axially outward from the blocking plug, the plug projection having a diameter slightly larger than the diameter of the cavity.

17. The apparatus of claim 11 wherein the plurality of bracket rails define a plurality of inner bracket channels and a plurality of outer bracket channels.

18. The apparatus of claim 11 wherein the pair of connector rails define an inner connector channel.

19. The apparatus of claim 11 wherein the pair of connector rails define an outer connector channel.

20. The apparatus of claim 11 wherein said retainer projection on the bracket aligns with said lock projection on the connector to secure the connector to the bracket.

* * * * *